United States Patent
Kim

(10) Patent No.: US 11,095,954 B2
(45) Date of Patent: Aug. 17, 2021

(54) VIDEO-PROVIDING METHOD AND VIDEO-PROVIDING SYSTEM

(71) Applicant: NAVER Corporation, Seongnam-si (KR)

(72) Inventor: Yu-Sik Kim, Seongnam (KR)

(73) Assignee: NAVER CORPORATION, Sungnam (KR)

( * ) Notice: Subject to any disclaimer, the term of this patent is extended or adjusted under 35 U.S.C. 154(b) by 457 days.

(21) Appl. No.: 15/156,900

(22) Filed: May 17, 2016

(65) Prior Publication Data

US 2016/0261930 A1 Sep. 8, 2016

Related U.S. Application Data

(63) Continuation of application No. PCT/KR2014/011014, filed on Nov. 17, 2014.

(30) Foreign Application Priority Data

Nov. 20, 2013 (KR) .................... 10-2013-0141536
Jul. 21, 2014 (KR) .................... 10-2014-0091871

(51) Int. Cl.
| | |
|---|---|
| *H04N 21/845* | (2011.01) |
| *H04L 29/06* | (2006.01) |
| *G11B 27/031* | (2006.01) |
| *G11B 27/036* | (2006.01) |
| *G11B 27/10* | (2006.01) |
| *H04N 21/8547* | (2011.01) |

(52) U.S. Cl.
CPC ....... *H04N 21/8456* (2013.01); *G11B 27/031* (2013.01); *G11B 27/036* (2013.01); *G11B 27/10* (2013.01); *H04L 65/60* (2013.01); *H04L 65/602* (2013.01); *H04N 21/845* (2013.01); *H04N 21/8547* (2013.01)

(58) Field of Classification Search
CPC ........................................ H04L 65/60
USPC .................. 386/239–248, 278–290
See application file for complete search history.

(56) References Cited

U.S. PATENT DOCUMENTS

| 9,110,988 B1* | 8/2015 | Tan .............. G06F 17/30784 |
| 2010/0077289 A1* | 3/2010 | Das .............. G06F 17/30551 |
| | | 715/230 |
| 2013/0188923 A1* | 7/2013 | Hartley .............. H04N 9/87 |
| | | 386/241 |

FOREIGN PATENT DOCUMENTS

| JP | 2001-245281 | 9/2001 |
| JP | 2003-189224 | 7/2003 |
| JP | 2006-080670 | 3/2006 |
| JP | 2007-122110 | 5/2007 |
| JP | 2011-120308 | 6/2011 |

(Continued)

OTHER PUBLICATIONS

Int'l. Search Report issued in Int'l. App. No. PCT/KR2014/011014, dated Feb. 9, 2015.

(Continued)

*Primary Examiner* — Hung Q Dang
(74) *Attorney, Agent, or Firm* — Greer Burns & Crain Ltd.

(57) ABSTRACT

A video-providing system includes a first grouping unit configured to generate a first group that is a collection of one or more video files; a second group unit configured to group at least a portion of video files from the video files included in the first group; and a providing unit configured to provide video files selected from the video files included in the second group unit.

14 Claims, 7 Drawing Sheets

(56) References Cited

FOREIGN PATENT DOCUMENTS

| | | |
|---|---|---|
| JP | 2012-105236 | 5/2012 |
| JP | 2012-142760 | 7/2012 |
| KR | 10-2008-0040063 | 5/2008 |
| KR | 10-2012-0086455 | 8/2012 |
| KR | 10-2013-0037315 | 4/2013 |
| KR | 10-2011-0110952 | 5/2013 |
| WO | 2011/145249 | 11/2011 |
| WO | 2013/161319 | 10/2013 |

OTHER PUBLICATIONS

Office Action issued by the Patent Office of Japan for corresponding Japanese Patent Application No. 2016-546725, dated Jun. 20, 2017.
Office Action issued by the Chinese Patent Office for corresponding Chinese Patent Application No. 201480049870.6, dated Jan. 25, 2018.

* cited by examiner

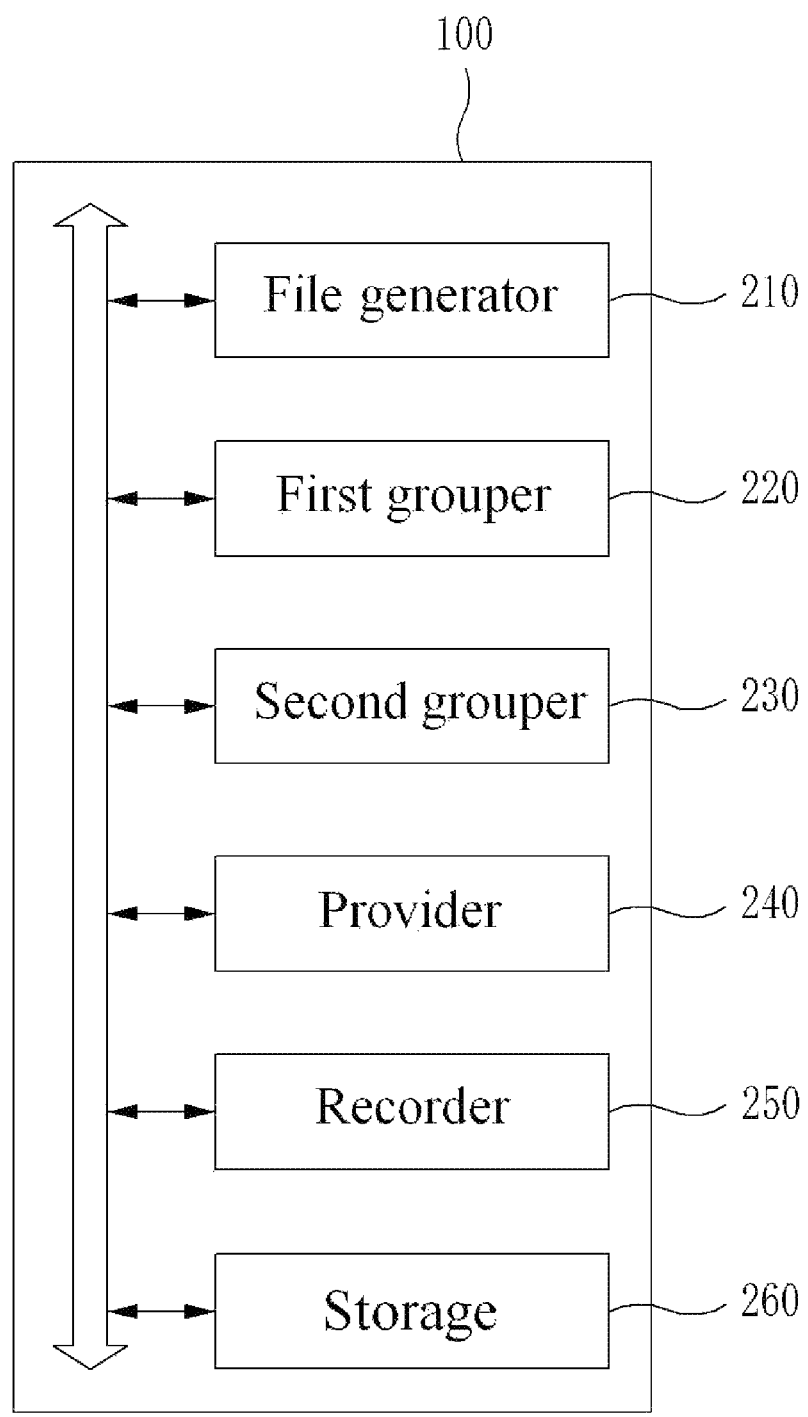

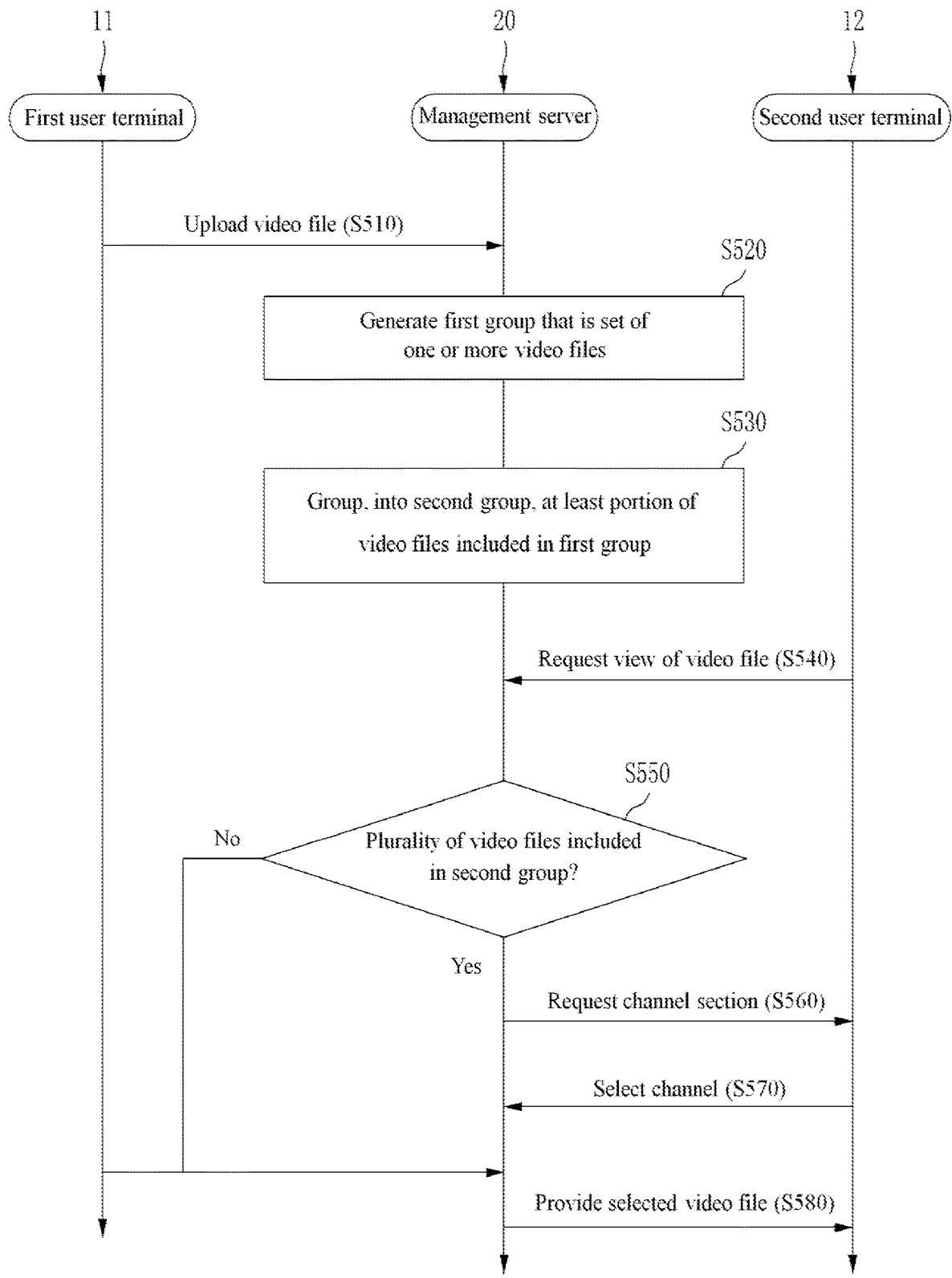

VIDEO-PROVIDING METHOD AND VIDEO-PROVIDING SYSTEM

CROSS-REFERENCE TO RELATED APPLICATIONS

This application is a continuation of International Application No. PCT/KR2014/011014 filed on Nov. 17, 2014, which claims priority under 35 U.S.C. § 119 to Korean Patent Application No. 10-2013-0141536 filed Nov. 20, 2013 and Korean Patent Application No. 10-2014-0091871 filed Jul. 21, 2014, in the Korean Intellectual Property Office (KIPO), the entire contents of which are incorporated herein by reference.

BACKGROUND OF THE INVENTION

Technical Field

One or more exemplary embodiments of the present invention relate to a video providing method and a video providing system, and more particularly, to a method and a system that provide a user-customized video to a user.

Related Art

In recent times, with the development in video creation technology, ordinary users without technical knowledge about video may easily create contents. For example, ordinary users may easily create contents using a photo function of a camera provided on a portable terminal, such as a smartphone and the like.

Also, a user may easily access video contents created by other users. Creation and sharing of video contents are being actively performed.

Here, video content currently being shared is a final version edited by a creator of a video, for example, an editor. Thus, a user consuming the video may not view a desired part of the video.

For example, videos of a movie, a song program, a soap opera, and the like, are acquired by videotaping a target using a plurality of cameras, instead of using a single camera. Also, a footage taken by a user present on an event site with respect to a specific event, for example, an unpredicted incident is acquired using a plurality of cameras, for example, cameras provided on smartphones. Due to characteristics of today's video distribution, only a single video may be distributed instead of distributing all the videos and thus, videos videotaped using the respective cameras may be edited to configure a single final version.

Herein, a video file that is a final version is a file that is selected and collected by an editor from a plurality of video files, and remaining files aside from the selected file are discarded, which leads to waste of resources. Also, the final version is edited in terms of subjective perception of the editor and thus, may not readily satisfy users having various tastes.

A prior art, Korean Patent Publication No. 10-2011-0110952, published on May 8, 2013, discloses a video service providing method and a video service providing apparatus. However, a list is extracted from a web server that provides videos and, if necessary, is selectively provided to a display device. Thus, although the convenience in providing videos is considered, the aforementioned issues are not solved.

Accordingly, there is a need for technology for outperforming the aforementioned issues.

The above-noted related art relates to technical information maintained by the inventor for conceiving the present disclosure or acquired during a process of conceiving the present disclosure and thus, cannot be referred to as the known art having been publicly published prior to the filing of the present application.

SUMMARY OF THE INVENTION

Exemplary embodiments of the present invention provide a video providing method and a video providing system.

As technical means to achieve the aforementioned technical objects, according to a first aspect of exemplary embodiments, there is provided a video providing system including a first grouper configured to generate a first group that is a set of one or more video files, a second grouper configured to group at least a portion of the video files included in the first group, and a provider configured to provide a video file selected from the video files included in the second grouper.

Also, according to a second aspect of exemplary embodiments, there is provided a video providing method including generating a first group that is a set of one or more video files, grouping, into a second group, at least a portion of the video files included in the first group, and providing a video file selected from the video files included in the second group.

Also, according to a third aspect of exemplary embodiments, there is provided a non-transitory computer-readable recording medium storing a program to implement a video providing method including generating a first group that is a set of one or more video files, grouping, into a second group, at least a portion of the video files included in the first group, and providing a video file selected from the video files included in the second group.

Also, according to a fourth aspect of exemplary embodiments, there is provided a computer program for executing a video providing method, wherein the computer program includes codes to control a computer to perform generating a first group that is a set of one or more video files, grouping, into a second group, at least a portion of the video files included in the first group, and providing a video file selected from the video files included in the second group.

According to one or more exemplary embodiments, a video providing method and a video providing system are provided.

Also, according to one or more exemplary embodiments, a user may select and view a desired video. In particular, the user may view one or more videos that are collected in association with a desired time zone or a desired event, at variety of angles.

The effects obtainable from the exemplary embodiments are not limited thereto and other effects not described herein will be apparent to those skilled in the art from the following description.

BRIEF DESCRIPTION OF THE DRAWINGS

FIG. 2 is a block diagram illustrating a video providing system according to an exemplary embodiment.

FIGS. 4 and 5 are flowcharts illustrating a video providing method according to exemplary embodiments.

DETAILED DESCRIPTION OF THE INVENTION

Figure 1:
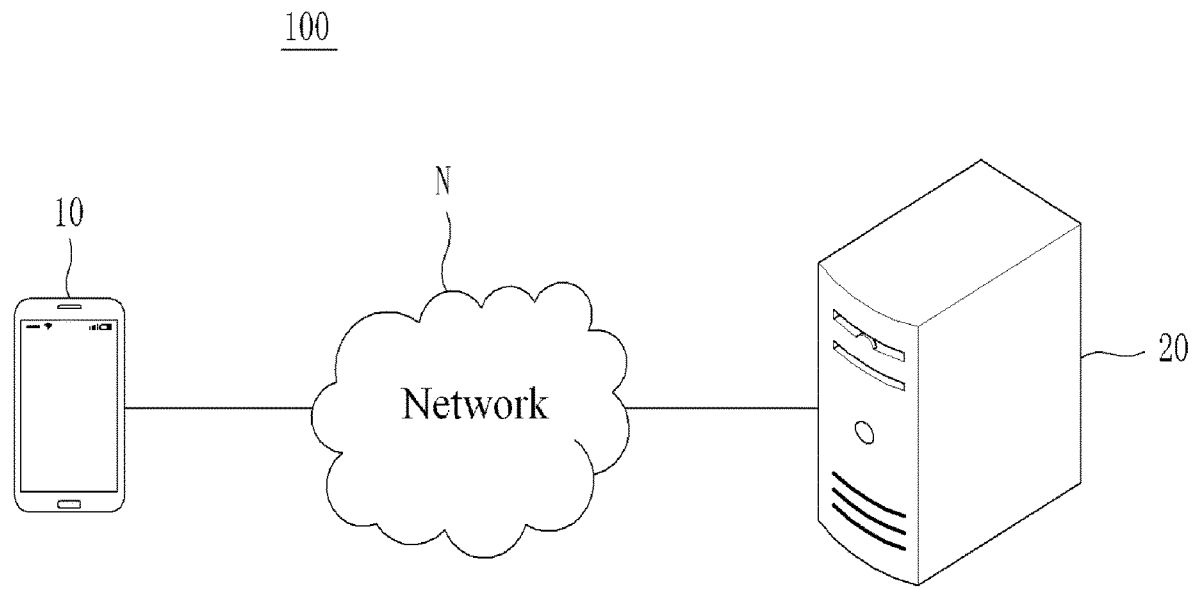
FIG. 1 is a diagram of a video providing system according to an exemplary embodiment.

Hereinafter, one or more example embodiments will be described in detail to be easily implemented by those skilled in the art with reference to the accompanying drawings. Example embodiments, however, may be embodied in various different forms, and should not be construed as being limited to only the illustrated embodiments. To clearly describe the example embodiments, a portion irrelevant to the description is omitted and like reference numerals refer to like constituent elements throughout.

When an element is referred to as being "connected to" another element, the element may be "directly connected to" or "electrically connected to" the other element, or one or more other intervening element may be present. Also, when an element "comprises/includes" another constituent component, it indicates that the element may further include the other constituent element instead of excluding the other constituent component, unless the context clearly indicates otherwise.

Hereinafter, exemplary embodiments will be described in detail with reference to the accompanying drawings.

FIG. 1 is a diagram to describe a video providing system according to an exemplary embodiment.

Referring to FIG. 1, a video providing system 100 includes a user terminal 10.

The user terminal 10 may be a computer, a portable terminal, a television (TV), a wearable device, etc., accessible to a remote server or connectable to another terminal and a server over a network N. Here, a computer may include, for example, a laptop, a desktop, and a notebook in which a web browser is installed. A portable terminal, as a wireless communication device of which portability and mobility are guaranteed, may include any type of handheld-based wireless communication devices, for example, a Personal Communication System (PCS), a Personal Digital Cellular (PDC), a Personal Handyphone System (PHS), a Personal Digital Assistant (PDA), Global System for Mobile communications (GSM), International Mobile Telecommunication (IMT)-2000, Code Division Multiple Access (CDMA)-2000, W-Code Division Multiple Access (W-CDMA), Wireless Broadband Internet (Wibro), a smartphone, Mobile Worldwide Interoperability for Microwave Access (WiMAX), etc. Also, a TV may include, for example, an Internet Protocol Television (IPTV), an Internet TV, a terrestrial TV, a cable TV, etc. Further, a wearable device, as a wearable information processing device, for example, a watch, glasses, accessories, clothing, shoes, etc., may access a remote server or connect to another terminal directly or over a network through another information providing device.

The user terminal 10 may provide a video file to another terminal (not shown). Also, the user terminal 10 may receive a video file from another terminal using a streaming method, or may be provided with a video file by receiving, storing, and playing back the video file.

The video providing system 100 further includes a management server 20. The management server 20 communicates with the user terminal 10 over the network N.

Here, the network N may be configured into any type of wired/wireless networks, for example, a Local Area Network (LAN), a Wide Area Network (WAN), a Value Added Network (VAN), a Personal Area Network (PAN), a mobile radio communication network, Wibro, Mobile WiMAX, High Speed Downlink Packet Access (HSDPA), a satellite communication network, etc.

The management server 20 may be configured as a server that receives an access from the user terminal 10. For example, the management server 20 may be configured into a server system including a web server, a load balancing server, a database server, etc. Also, the management server 20 may embody a video providing method according to example embodiments as a Platform as Service (PaaS) or Software as Service (SaaS).

The user terminal 10 communicates with the management server 20 and may upload a video file through access to the management server 20, and may also receive a video file stored in the management server 20 using a streaming method, or may be provided with a video file by receiving, storing, and playing back the video file.

Although a plurality of user terminals 10 and management servers 20, described above, may be present in the video providing system 100, FIG. 1 illustrates a single user terminal 10 and a single management server 20 for clarity of description.

Figure 3A:
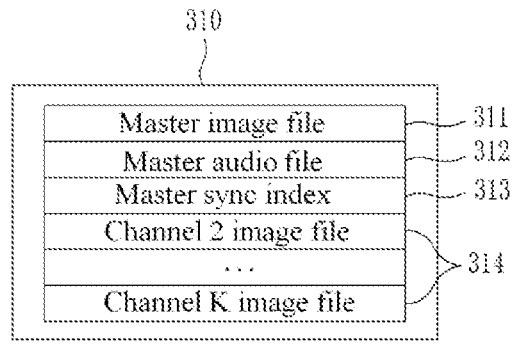
FIGS. 3A-3C illustrate examples of a data structure according to exemplary embodiments.
Figure 3B:
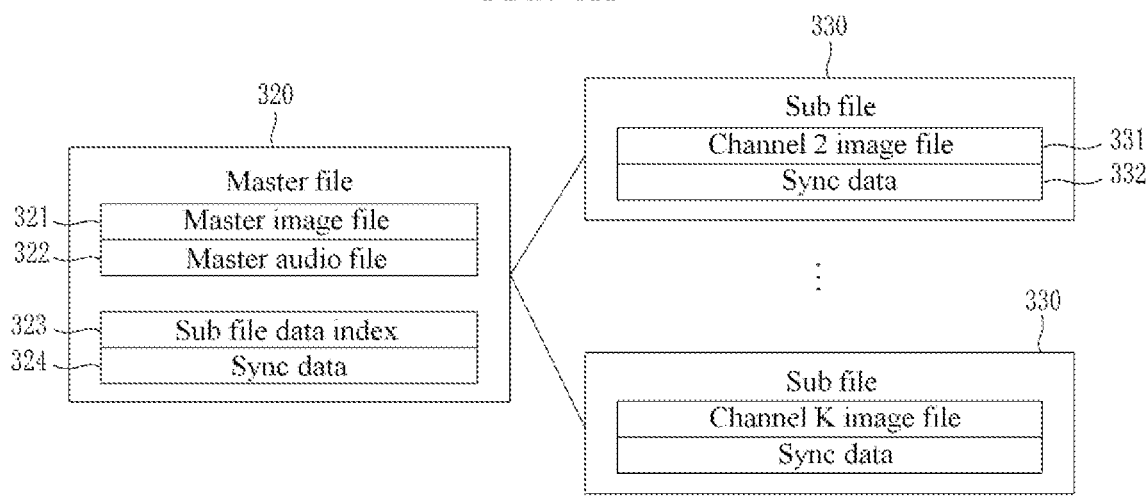
Figure 3C:
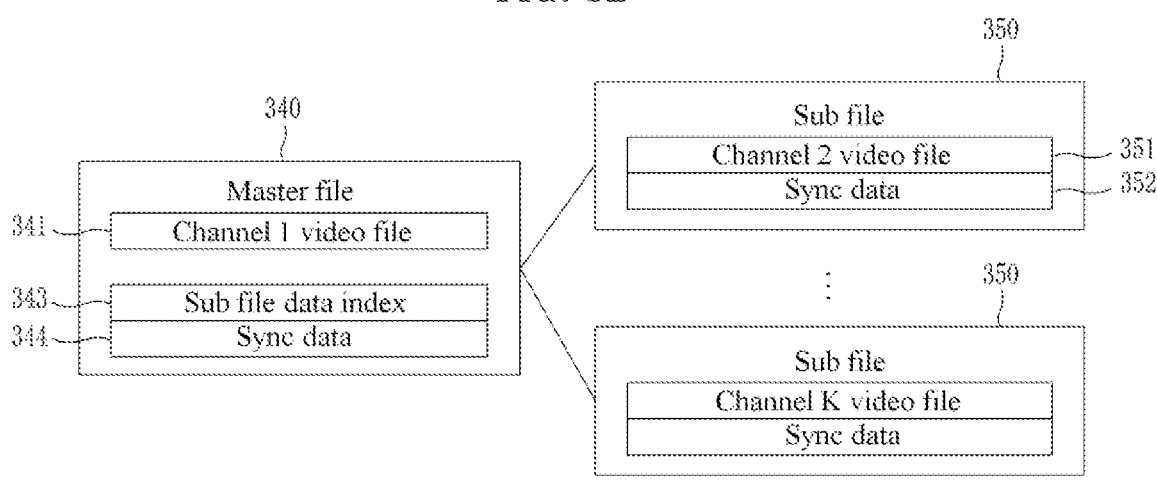

FIG. 2 is a block diagram illustrating a video providing system 100 according to an exemplary embodiment, and FIGS. 3A-3C are diagrams illustrating an example of a data structure of a second group to describe a video providing system and a video providing method according to exemplary embodiments.

Referring to FIG. 2, the video providing system 100 includes a file generator 210, a first grouper 220, a second grouper 230, a provider 240, and a recorder 250.

Also, the video providing system 100 may include a communicator (not shown) that enables communication between internal constituent elements, that is, communication among the file generator 210, the first grouper 220, the second grouper 230, the provider 240, and the recorder 250, and that enables communication with an external constituent element.

The video providing system 100 may include a storage 260 to store data for performing the video providing method according to example embodiments, and may communicate with a storage device (not shown), for example, a database, positioned outside of or external to the video providing system 100.

The file generator 210 generates a video file.

Here, a video file may include an image file and an audio file. That is, a video file may include an audio file to store information about an audio included in a video, and may include, as the image file, remaining file information aside from the audio file in the video file.

Also, a video file may include position information about a position associated with the video and time information about a time associated with the video. The position information may include, for example, a position at which the video was taken, for example, a global positioning system (GPS) value, information about a position associated with content of the video, and the like. The time information may include, for example, the time, such as a timestamp, at which the video was taken, the time associated with content of the video, such as a timestamp generated based on a standard time zone, and the like.

The first grouper 220 is configured to generate a first group that is a set of one or more video files.

Here, the first grouper 220 may group a video file into the first group based on at least one of position information and time information of each of the one or more video files.

That is, the first grouper 220 may group a video file into the first group based on position information of the video file. For example, the first grouper 220 may group, into the first group, one or more video files having position information present within a preset radius from a specific position.

Also, the first grouper 220 may group a video file into the first group based on time information of the video file. For example, the first grouper 220 may group, into the first group, one or more video files having time information within a preset range based on a specific time. To this end, the first grouper 220 may convert a timestamp indicating time information recorded at a user terminal having generated or edited each video file, into consideration of a standard time zone. For example, the first grouper 220 may group, into the first group, a video file taken in England at the same time as a specific time in Korea. For example, if the specific time in Korea is 7 A.M. of a specific date, the same time in England will be 3 P.M. of the specific date, taking into consideration of 8-hour time difference between Korea and England.

Also, the first grouper 220 may group, into the first group, a video file corresponding to an audio file determined to be a similar audio based on the audio file extracted from the video file. To this end, the first grouper 220 may analyze a waveform of each audio file and may group, into the first group, a video file that includes an audio file having the similar waveform. Also, the first grouper 220 may group, into the first group, a video file that includes an audio file in which a specific comment or sound is present.

The second grouper 230 groups at least a portion of video files included in the first group.

That is, the second grouper 230 may synchronize at least a portion of the video files included in the first group. Accordingly, the second grouper 230 may synchronize all of or a portion of the video files included in the first group. Here, the second grouper 230 may enable all of the video files included in the first group to be automatically grouped into a second group.

Here, the second grouper 230 may synchronize a video file based on a time index of the video file, for example, a play time of a corresponding frame among the entire frames. For example, the second grouper 230 may set a timestamp of a video file to a time index and may synchronize the video file based on the time index. Also, the second grouper 230 may divide the video file into frames, and may allocate a time index to each of the frames. For example, the second grouper 230 may set a time index of each video file based on a play time of a video file having a longest time index among video files to be grouped into the second group, and may synchronize the video files based on the time indices.

Also, the second grouper 230 may synchronize a video file based on an audio file of the video file. For example, the second grouper 230 may synchronize a video file based on a waveform included in an audio file of the video file, a point in time at which a specific word or sound appears in the audio file, and the like.

Once synchronization is completed, the second grouper 230 may match each video file included in the second group to a channel.

Here, the term "channel" refers to identification (ID) information that is matched to each video file and used to call and provide a corresponding video file to a user. For example, in response to a selection of a user on a single channel, a video file matched to the selected channel may be provided to the user. Also, each channel may be matched to a control interface having user-control functions for a video playback, pause, channel selection and/or channel change, etc. The control interface may be matched to selected channel and be displayed on screen of the user terminal 10. Accordingly, the second grouper 230 may match the control interface to each video file included in the second group.

The number of channels that are the same as or different from the number of video files included in the second group may be present. A channel may be matched to each of the video files included in the second group by the second grouper 230, or may be matched to each of the video files included in the second group by the user.

Further, the second grouper 230 may additionally generate a channel in addition to an existing channel. The second grouper 230 may generate a control interface corresponding to the generated channel and enables a user desiring to view a video matched to a specific channel to select the channel.

When synchronizing video files included in the second group, the second grouper 230 may synchronize the video files by setting a master file and a sub file based on the video files included in the second group.

Here, the term "master file" denotes a video file that may be provided to the user as a default if the user requests viewing of the second group and in this instance, a specific channel is not set. The term "sub file" denotes one of the remaining video files excluding the video file set as the master file from the video files included in the second group. Also, the term "master audio file" denotes an audio file included in the master file or an audio file stored in the video providing system, and may have a time index. Also, the term "master image file" denotes an image file included in the master file or an image file stored in the video providing system, and may have a time index.

The second grouper 230 may set, as the master file, for example, a video file firstly uploaded at the video providing system, or may provide a list of video files included in the second group and may set, as the master file, a video file selected by the user.

FIGS. 3A-3C illustrate examples of a data structure of a second group that is a set of synchronized video files. Although not illustrated, the data structure of the second group may include a header for including information about second group ID information for identifying the second group, the total number of video files included in the second group, the number of channels allocated to the second group, a video file corresponding to each channel, and a play time of the second group. The play time may be the same as the total play time of at least one of the video files included in a video group. Also, each of the video files included in the second group may be divided into frames and a time index may be allocated to each frame.

FIG. 3A illustrates a data structure 310 that includes a master image file 311, a master audio file 312, a master synchronization (sync) index 313, and a channel K image file 314.

Here, the master sync index 313 denotes a time index for synchronizing a master image file and a channel K image file. The channel K image file 314 denotes a sub image file to be matched to each channel. For example, "channel 2 image file" denotes a sub image file to be matched to channel 2.

FIG. 3B illustrates a data structure that includes a master file 320 and sub files 330.

The master file 320 has a data structure that includes a master image file 321, a master audio file 322, a sub file data index 323, and sync data 324. Here, the sub file data index 323 may include information, such as the number of sub files, file ID information of each sub file, etc. Also, the sync data 324 is used as data for synchronizing a master image file and a channel K image file together with sync data 332 included in the sub file 330.

The sub file 330 has a data structure that includes a channel K image file 331 to be matched to each channel and the sync data 332.

The aforementioned data structure shown in FIG. 3B may be applicable when a file capacity is large due to a relatively long play time or high quality of at least one of the video files included in the second group.

FIG. 3C illustrates a data structure that includes a master file 340 and sub files 350.

The master file 340 has a data structure that includes a video file 341 set as a master, a sub file data index 343, and sync data 344.

The sub file 350 has a data structure that includes a video file 351 to be matched to each channel and sync data 352.

The aforementioned data structure shown in FIG. 3C may be applicable when playing back a sound source using an audio file of each video file. That is, compared to FIG. 3C, in response to a selection of a specific channel, even an audio of a video file matched to the selected channel may be played back.

The second grouper 230 sets the master file. Thus, when the video file selected through the control interface is absent, the second grouper 230 enables the provider 240 to provide the master file.

The provider 240 provides a video file selected from the video files included in the second group.

Here, a channel may be selected through a control interface. The provider 240 may provide a video file corresponding to the selected channel.

Accordingly, in response to a selection of another video file included in the second group while providing one video file included in the second group, the provider 240 may provide the selected other video file together with the one video file or may suspend the one video file being provided and may provide the selected video file.

Also, in response to a selection of a user on a plurality of channels, the provider 240 may simultaneously provide videos that are matched to the selected channels. In particular, the provider 240 may divide a screen of a user terminal of the user, may allocate a channel to each divided screen, and may display a video file corresponding to each channel on each divided screen.

The provider 240 may store a second group and provide a video file included in the second group using a streaming method. Alternatively, the provider 240 enables a terminal, which is to play back the video file included in the second group, to store the second group and to play back the video file included in the second group.

Also, although a channel is continuously changed by the user, the provider 240 may continuously play back a master audio file that is matched to a corresponding time index, for continuity of an event image being provided.

As described above, a video file included in the second group may be played back by the user and an image to be finally displayed for the user as that result is referred to as an event image.

The recorder 250 is configured to record the event image. For example, since K channels are present with respect to an event image where k denotes an integer greater than or equal to 1, a user may play back a video while switching K channels. The recorder 250 may store the event image by recording an image played by the user.

Also, the recorder 250 may communicate with a third party server (not shown) that is configured to communicate with the video providing system 100 and enables the third party server to share the event image.

Accordingly, for example, the user may generate an event image by recording an image being viewed by the user, and may distribute the generated event image to a third party through the third party server and thereby share the event image.

Each of the file generator 210, the first grouper 220, the second grouper 230, the provider 240, and the recorder 250 may be configured in each of the user terminal 10 or the management server 20.

According to an exemplary embodiment, the file generator 210, the provider 240, and the recorder 250 may be configured in the user terminal 10, and the first grouper 220 and the second grouper 230 may be configured in the management server 20.

According to another exemplary embodiment, all of the file generator 210, the first grouper 220, the second grouper 230, the provider 240, and the recorder 250 may be configured in the user terminal 10.

Figure 4:
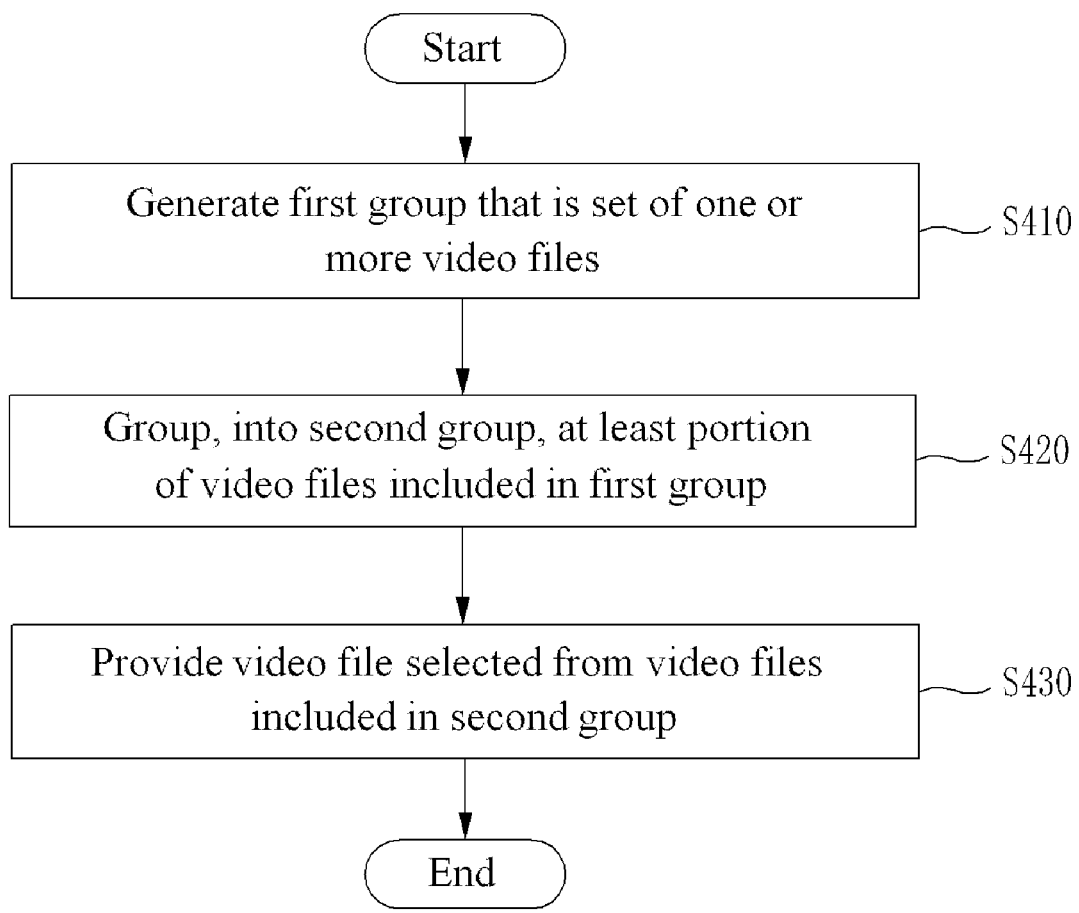

The video providing method according to exemplary embodiments of FIGS. 4 and 5 includes operations processed at the video providing system 100 of FIGS. 1 and 2. Accordingly, although a description relating thereto is omitted, the description relating to the video providing system 100 made above with reference to FIGS. 1 and 2 may be applicable to the video providing method according to example embodiments of FIGS. 4 and 5.

The video providing system 100 may acquire a video file. The video providing system 100 may acquire the video file by generating the video file or through uploading of the video file. For example, the file generator 210 configured in the user terminal 10 may acquire the video file by generating the video file or the management server 20 may acquire the video file through uploading of the video file from the user terminal 10. Here, the video file may have time information, such as a timestamp, or may have position information, such as GPS information.

Referring to FIG. 4, in operation S410, the video providing system 100 may generate a first group that is a set of one or more video files. For example, the first grouper 220 configured in the management server 10 may generate the first group.

Here, the video providing system 100 may generate the first group based on at least one of position information and time information of each of the one or more video files. Also, the video providing system 100 may generate the first group based on an audio file extracted from the one or more video files.

In operation S420, the video providing system 100 groups, into a second group, at least a portion of the video files included in the generated first group. For example, the second grouper 230 configured in the management server 10 may generate the second group.

That is, the video providing system 100 groups, into the second group, at least a portion of the video files included in the first group by synchronizing at least a portion of the video files. Here, the video providing system 100 may synchronize at least a portion of the video files based on a time index of each of at least a portion of the video files or may synchronize at least a portion of the video files based on an audio file of each of at least a portion of the video files.

Also, when synchronizing each of at least a portion of the video files included in the second group, the video providing system 100 may match each video file to a control interface. Here, a video file and a control interface may one-to-one correspond to each other. Also, a plurality of video files may be matched to a single control interface. Alternatively, a single video file may be matched to a plurality of control interfaces.

In operation S430, the video providing system 100 may provide a video file selected from the video files included in the second group. For example, the provider 240 configured in the user terminal 10 may play the video file provided by the management server 20 on the screen of the user terminal 10. Accordingly, the user may view a video included in the second group.

Here, the user may select a control interface to be matched to each video file, and the video providing system 100 may provide the selected video file through the control interface.

In particular, the video providing system 100 may provide the selected video file after a video file being provided prior to a selection point in time at which the selection is performed. Here, the video providing system 100 may provide the selected video file by using a time index of the selection point in time as a start time.

Also, the video providing system 100 may selectively provide an audio file being provided prior to the selection point in time together with an image file of the selected video file. That is, for example, in response to a selection of a video file while an audio file of channel 1 is continuously being played back, the video providing system 100 may provide only an image file of the selected video file and an audio may provide the audio file of the channel 1. Accordingly, an event image may be seamlessly provided.

Also, the video providing system 100 may provide a master file based on the time index of the selection point in time and the selected video file. That is, when the selected video file does not have the time index of the selection point in time, for example, when an image file or an audio file to be played back from the selection point in time is absent, the video providing system 100 may provide a master file for continuity of the event image.

FIG. 5 is a flowchart illustrating the video providing method of FIG. 4 in more detail. In detail, FIG. 5 is a flowchart of the video providing method performed by configuring each constituent element of the video providing system 100 in the user terminal 10 and the management server 20. For clarity of the description, the user terminal 10 that is controlled by a user who is to upload a video file is referred to as a first user terminal 11, and the user terminal 10 that is controlled by a user who is to view a video file included in a second group is referred to as a second user terminal 12.

In operation S510, the first user terminal 11 uploads a video file taken with respect to a single event to the management server 20. One or more first user terminals 11 as above may be present in the video providing system 100. Thus, one or more video files may be uploaded to the management server 20.

The management server 20 may generate a first group of the uploaded video files. For example, the management server 20 may generate a group that includes a video file generated or edited at a specific position, or a group that includes a video file generated or edited at a specific time.

Also, when a plurality of video files is included in the first group, the management server 20 may set one of the video files as a master file and may set remaining video files as sub files in operation S520. If a single video file is included in the first group, the management server 20 may set the video file as a master file.

In operation S530, the management server 20 groups and stores the uploaded video file as a second group. Here, a video file to be grouped into the second group may be a video file selected by providing the user with a list of video files included in the first group, may be a video file automatically selected by the management server 20, or may refer to all of the video files included in the first group.

In operation S540, the management server 20 receives a view request from the second user terminal 12. That is, the management server 20 may receive a request for viewing at least one of the video files included in the second group, from the second user terminal 12 through a control interface.

In operation S550, the management server 20 determines whether a plurality of video files is included in the second group.

When a single video file is included in the second group, the management server 20 may provide the single video file. On the contrary, when the plurality of video files is included in the second group, the management server 20 enables the second user terminal 12 to select at least one specific channel by providing a control interface in operation S560. In response to a selection of at least one of the video files included in the second group through the control interface in operation S570, the management server 20 provides the selected video file in operation S580.

If a video file corresponding to the channel selected through the control interface is absent, the management server 20 provides a master file, for example, at least one of a master image file and a master audio file, to the second user terminal 12.

Although not illustrated in FIG. 5, the management server 20 may provide all of the video files included in the second group to the second user terminal 12 in response to the view request from the second user terminal 12 in operation S540. In this case, the second user terminal 12 may become an entity that downloads the second group and performs operations S560 through 580.

FIGS. 6A-6D illustrate an example of providing a user with each of video files 610, 620, and 630 taken through camera devices mounted to three user terminals 10, respectively, based on the video providing method according to an exemplary embodiment.

Figure 6B:
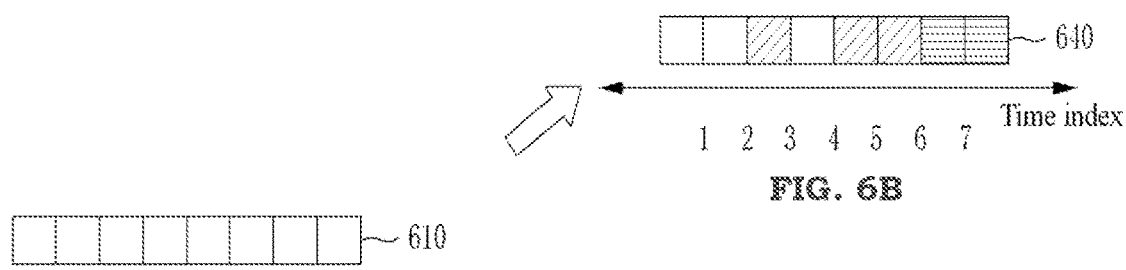
FIGS. 6A-6D illustrate a video providing method according to an exemplary embodiment.
Figure 6C:
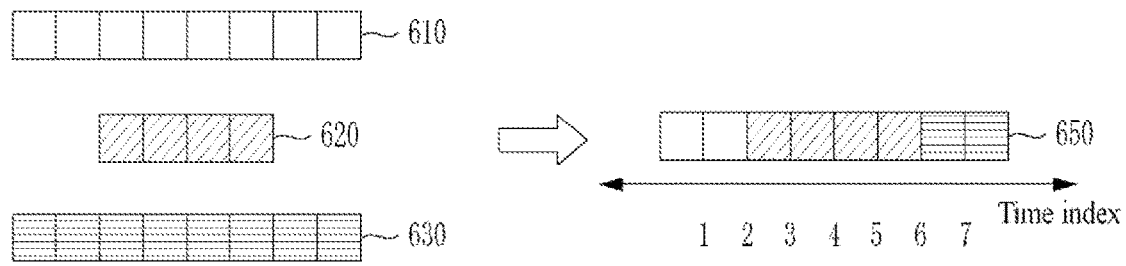
Figure 6A:
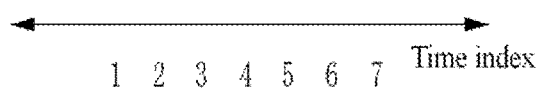

That is, FIG. 6A illustrates an example of the video files 610, 620, and 630 taken through three user terminals 10, respectively. A block illustrated in each video file refers to a frame and has a time index. Each video file of FIGS. 6A-6D is illustrated based on the time index. For example, the video file 620 has time indices from 2 to 6.

Also, the video files 610, 620, and 630 are included in a second group.

In the related art, if only an event image 640 edited by an editor as shown in FIG. 6B is distributed, the user may view only the event image 640. According to the video providing system 100 and the video providing method according to exemplary embodiments, the user may view an event image at various angles.

For example, in a case in which the video files 610, 620, and 630 are allocated to channel 1, channel 2, and channel 3, respectively, and a user viewing the video file corresponding to channel 1 selects channel 2 through a control interface matched to channel 2, the user may view the video file 620. In a case in which the user does not select another channel by a point in time at which playback of the video file 620 ends, that is, time index 6 corresponding to a point in time at which a separate frame is absent, the user may view the video file 610 of channel 1 set as a master file and may view an event image 650 as shown in FIG. 6C.

Figure 6D:
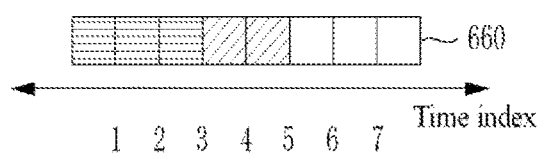

Also, in a case in which the user selects channel 2 at a point in time of time index 3 while viewing the video file 630 corresponding to channel 3, the user may view the video file 620 corresponding to channel 2. In a case in which the user selects channel 1 at a point in time of time index 5, the user may view the video file 610 corresponding to channel 1. As a result, the user may view an event image 660 as shown in FIG. 6D. That is, according to example embodiments, the user may seamlessly view a video file suitable for the taste of the user, instead of viewing an image file edited by an editor.

Figure 7:
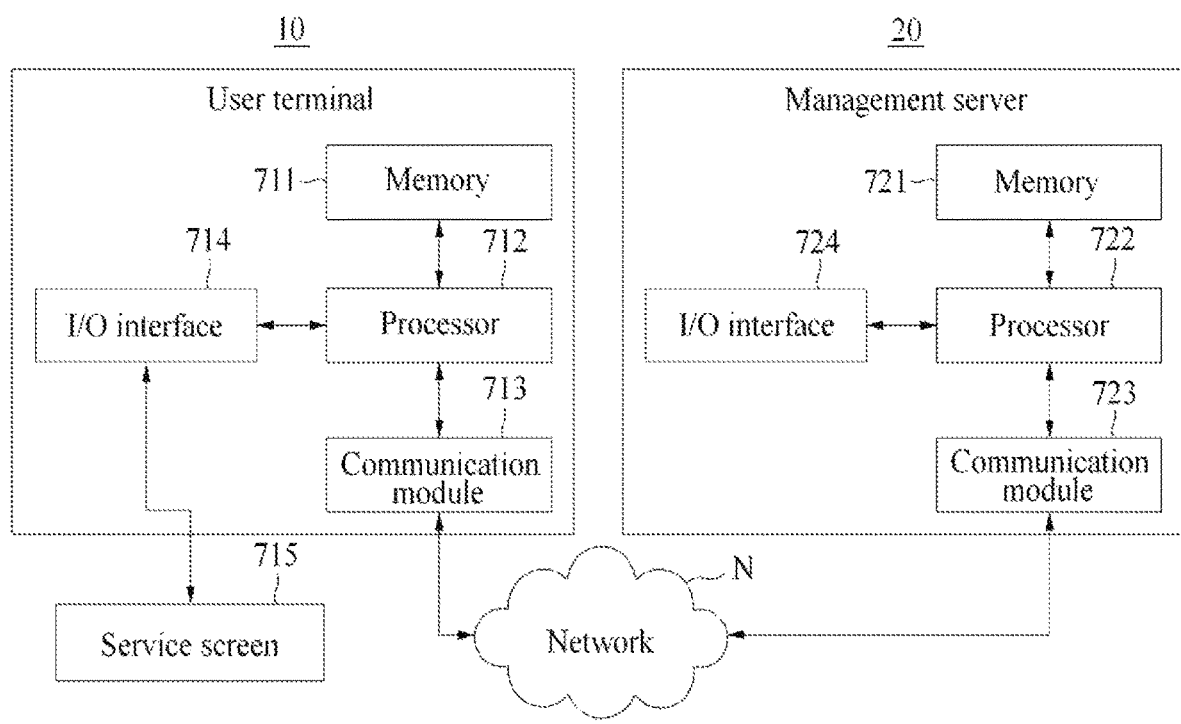
FIG. 7 is a block diagram illustrating a configuration of a user terminal and a server according to one exemplary embodiment.

FIG. 7 is a block diagram illustrating a configuration of the user terminal 10 and the management server 20 according to one exemplary embodiment.

The user terminal 10 and the management server 20 may include memories 711, 721, processors 712 and 722, communication modules 713 and 723, and input/output (I/O) interfaces 714 and 724. Each of the memories 711 and 721 may include a permanent mass storage device, such as a random access memory (RAM), a read only memory (ROM), a disc drive, a solid state drive, an optical drive, etc., as a computer-readable storage medium. Also, each of the memories 711 and 721 may store an operating system (OS) and at least one program code (e.g., an instruction for an application installed and executed on the user terminal 10). Such software constituent elements may be loaded from another computer-readable storage medium separate from the memories 711 and 721 using a drive mechanism (not shown). Other computer-readable storage medium may include, for example, a floppy drive, a disc, a tape, a DVD/CD-ROM drive, a memory card, etc. Software constituent elements may be loaded to the memories 711 and 721 through the communication modules 713 and 723 instead of, or in addition to, the computer-readable storage medium. For example, at least one program may be loaded to the memories 711 and 721 based on a program installed by files that are provided from developers through the network N.

Each of the processors 712 and 722 may be configured to process computer-readable instructions of a computer program by performing a basic arithmetic operation, a logic operation, and an input/output operation. The computer-readable instructions may be provided from the memories 711 and 721 and/or the network interfaces 713 and 723 to the processors 712 and 722, respectively. The processors 712 and 722 may be configured to execute program codes stored in a storage device such as the memories 711 and 721.

The communication modules 713 and 723 may provide a function for communication between the user terminal 10 and the management server 20 over the network N, and may provide a function for communication between the user terminal 10 or the management server 20 and another user terminal or another server. For example, a request message created at the processor 712 of the user terminal 10 under control of the user may be transferred to the management server 20 over the network N under control of the communication module 713. Inversely, content provided from the processor 722 of the management server 20 may be received through the communication module 713 of the user terminal 10 over the communication module 723 and the network N, and be transferred to the processor 712 or the memory 711.

The I/O interfaces 714 and 724 may be used for interface with a variety of input devices and output devices. For example, the input devices may include devices such as a keyboard, a mouse, etc., and the output devices may include devices such as a display for displaying an application and a communication session of the application, etc. As another example, the I/O interfaces 714 and 724 may be used for interface with an apparatus in which an input function and an output function are integrated into a single function, such as a touch screen, etc.

In detail, for example, the processor 710 of the user terminal 10 may be configured so that a service screen 715 configured based on data provided from the management server 20 may be displayed through the I/O interface 714 when processing computer program instructions are loaded to the memory 711.

Further, according to other example embodiments, the user terminal 10 and the management server 20 may include a greater or lesser number of constituent elements than the number of constituent elements shown in FIG. 7. However, there is no need to clearly illustrate many constituent elements according to the related art. For example, the user terminal 10 may include other constituent elements such as a display or a transceiver, a global positioning system (GPS) module, a camera, etc.

The file generator 210, the first grouper 220, the second grouper 230, the provider 240, and/or the recorder 250 may be included in the processor 712 or 722.

According to an exemplary embodiment, the file generator 210, the provider 240, and the recorder 250 may be included in the processor 712 of the user terminal 10, and the first grouper 220 and the second grouper 230 may be included in the processor 722 of the management server 20.

According to another exemplary embodiment, all of the file generator 210, the first grouper 220, the second grouper 230, the provider 240, and the recorder 250 may be included in the processor 712 of the user terminal 10.

The elements of the processors 712 and 722 such as the file generator 210, the first grouper 220, the second grouper 230, the provider 240, and the recorder 250, may be representations of different functions configured by the processors 712 and 722. For example, the file generator 210 may be a representation of a function configured by the processor 712 to generate the video file.

The video providing method according to the example embodiments of FIGS. 4 and 5 may be configured in the form of recording media including computer-executable instructions, such as a program module executed by a computer. The non-transitory computer-readable media may be computer-accessible available media, volatile and non-volatile media, and separable and non-separable media. Also, the non-transitory computer-readable media may include computer storage media and communication media. The computer storage media may include volatile and non-volatile media and separate and non-separate media configured by predetermined methods or technology for storing information, such as computer-readable instructions, data structures, program module, or other data. The communication media may typically include computer-readable instructions, data structures, program modules, or other data of modulated data signals such as carrier waves, or other transmission mechanisms, and may include predetermined information transfer media.

Also, the video providing method according to the example embodiments may be configured in computer programs (or computer program products) including computer-executable instructions. The computer programs may include programmable machine instructions processed by a processor, high-level programming language, object-oriented programming language, assembly language, or machine language, and the like. Also, the computer programs may be recorded in tangible computer-readable recording media (for example, memory, hard disks, magnetic/optical media, or solid state drive (SSD), and the like).

The video providing method according to the example embodiments may be configured such that the computer programs may be executed by a computing apparatus. The computing apparatus may include at least a portion of a processor, a memory, a storage device, a high speed interface connected to a memory or a high speed expansion port, and a low speed interface connected to a low speed bus and a storage device. The respective elements may be inter-connected using a variety of buses and may be installed on a common motherboard or mounted using other appropriate schemes.

Here, the processor may process instructions within the computing apparatus. The instructions may refer to, for example, instructions stored in a storage device or a memory to display graphics information for providing a graphic user interface (GUI) on an external input/output device, such as a display connected to a high speed interface. According to other example embodiments, a plurality of processors and/or a plurality of buses may be used together with a plurality of memories and a memory form. Also, the processors may be configured as a chip set that includes chips including a plurality of independent analog and/or digital processors.

Also, the memory may store information within the computing apparatus. For example, the memory may include a volatile memory unit or a set thereof. As another example, the memory may include a non-volatile memory unit or a set thereof. Also, the memory may be another type of computer-readable recording media, for example, a magnetic or optical disc.

The storage device may provide a large storage space to the computing apparatus. The storage device may be computer-readable recording media or a configuration that includes the media. For example, the storage device may include apparatuses within a storage area network (SAN) or another configuration, and may be a floppy disk device, a hard disk device, an optical disc device, a tape device, a flash memory, and another semiconductor memory device similar thereto or an apparatus array.

The aforementioned description is provided for purposes of illustration and description. It will be appreciated by those skilled in the art that various modifications may be readily made without departing from the technical spirit or essential features of the disclosure. Thus, the exemplary embodiments should be understood to be illustrative in every aspect and not to be limiting. For example, each constituent element described in a singular form may be distributed and thereby implemented. Likewise, constituent elements described to be distributed may be implemented in a combined form.

The scope of the disclosure is within the claims rather than the detailed description. Also, it is to be interpreted that the meanings and the scope of the claims and all the changes or modifications from the equivalents thereof are included in the scope of the disclosure.

What is claimed is:

1. A video providing system for providing user selected portions of a video, the system comprising:
a first grouper configured to generate a first group that is a set of one or more video files, wherein the first grouper is further configured to generate the first group based on position information of each of the video files, wherein a determination is made by the first grouper as to whether the position information of each of the video files corresponds to a position within a preset radius from a specific position;
a second grouper configured to group at least a portion of the video files included in the first group into a second group, wherein the second grouper is further configured to generate a second group by synchronizing at portion of the video files included in the first group; and
a provider configured to provide a video file selected by the user from the video files included in the second group,
wherein the second grouper is further configured to generate a second group by synchronizing at least a portion of die video files based on a time index of each of at least a portion of the video files,
wherein the second grouper setting of the time index of each of the video files is based on the play time of the video file having the longest time index among the video files grouped into the second group synchronizes the video files based said longest time index,
wherein the video file having the longest time index is defined as the master file and the remaining video files in the second group are defined as sub files,
wherein the second grouper matches a channel to each of the video files in the second group,
wherein the second grouper is further configured to match each of the video files in the second group to a control interface,
wherein the provider is further configured to provide the selected video file through the control interface,
wherein the control interface is configured and arranged to allow the user to switch from the video file currently being provided by the provider at a selection point in time to the video file associated with another channel at the same selection point in time of the synchronized time index, and
wherein when the another channel selected by the user lacks an associated video file for the synchronized time index, the provider provides the video file at the synchronized time index associated with the master file.

2. The video providing system of claim 1, wherein the position information for each video file is derived from GPS information associated with each of the video files.

3. The video providing system of claim 1, wherein the first grouper is further configured to generate the first group based on an audio file extracted from the one or more video files.

4. The video providing system of claim 1, wherein the second grouper is further configured to generate the second group by synchronizing at least a portion of the video files based on an audio file of each of at least a portion of the video files.

5. The video providing system of claim 1, wherein the provider is further configured to selectively provide an audio file being provided prior to the selection point in time together with an image file of the selected video file.

6. The video providing system of claim 1, wherein the provider is further configured to provide the master file based on a time index of the selection point in time and the selected video file.

7. The video providing system of claim 1, wherein the number of videos files in the second group is less than the number of video files in the first group.

8. A video providing method of providing user selected portions of a video, the method comprising:
generating, by a processor, a first group that is a set of one or more video files, wherein the generating of the first group comprises generating the first group based position information of each of the video files, wherein the generating further includes determining whether the position information of each of the video files corresponds to a position within a preset radius from a specific position;

grouping, into a second group, at least a portion of the video files included in the first group, wherein the grouping also includes synchronizing at least a portion of the video files included in the first group; and providing a video file selected by the user from the video files included in the second group, wherein the grouping into the second group comprises grouping, into the second group, at least a portion of the video files by synchronizing at least a portion of the video files based on a time index of each of at least a portion of the video files, wherein:

the number of videos files in the second group is less than the number of video files in the first group;

the setting of the time index of each of the video files is based on the play time of the video file having the longest time index among the video files grouped into the second group and the synchronizing of the video files is based on said longest time index the video file having the longest time index is defined as the master file and the remaining video files in the second group are defined as sub files, the second grouper matches a channel to each of the video files in the second group, the second grouper is further configured to match each of the video files in the second group to a control interface, the provider is further configured to provide the selected video file through the control interface, the control interface is configured and arranged to allow the user to switch from the video file currently being provided by the provider at a selection point in time to the video file associated with another channel at the same selection point in time of the synchronized time index, and when the another channel selected by the user lacks an associated video file for the synchronized time index, the provider provides the video file at the synchronized time index associated with the master file.

9. The video providing method of claim 8, wherein the position information for each video file is derived from GPS information associated with each of the video files.

10. The video providing method of claim 8, wherein the generating of the first group comprises generating the first group based on an audio file extracted from the one or more video files.

11. The video providing method of claim 8, wherein the grouping into the second group comprises grouping at least a portion of the video files into the second group by synchronizing at least a portion of the video files based on an audio file of each of at least a portion of the video files.

12. The video providing method of claim 8, wherein the providing of the selected video file by using the time index of the selection point in time as the start time further comprises selectively providing an audio file being provided prior to the selection point in time together with an image file of the selected video file.

13. The video providing method of claim 8, wherein the providing of the selected video file further comprises providing the master file based on a time index of the selection point in time and the selected video file.

14. A non-transitory computer-readable recording medium storing a program to implement the method according to claim 8.

* * * * *